Sept. 24, 1940.  E. FENNESSY  2,215,783

METHOD OF AND APPARATUS FOR MEASURING FAR-END CROSS TALK

Filed Feb. 3, 1939

Inventor
E. Fennessy
by Ed Phinney
Attorney

Patented Sept. 24, 1940

2,215,783

UNITED STATES PATENT OFFICE 2,215,783

METHOD OF AND APPARATUS FOR MEASURING FAR-END CROSS TALK

Edward Fennessy, London, England, assignor to International Standard Electric Corporation, New York, N. Y.

Application February 3, 1939, Serial No. 254,377
In Great Britain February 4, 1938

4 Claims. (Cl. 179—175.3)

This invention relates to an arrangement for measuring the transmission properties of a circuit at a given frequency of the kind in which the current from the circuit is combined with that from a local oscillator to reduce the frequency to a constant value. According to this invention the current of the given frequency supplied to said circuit is derived from the said local oscillator through a frequency changer.

When measuring small values of cross talk (high cross talk attenuation) considerable difficulty is experienced with the detector used to provide an indication of the extremely small cross talk currents.

It is a common requirement for both voice frequency and carrier frequency cross talk measuring equipment, that the detecting apparatus used shall be capable of giving a clear deflection of the output meter for input levels as low as 140 decibels below 1 mw. This means that the detecting apparatus used must have a gain of approximately 130 decibels.

The limiting factor in the design of such high gain detecting apparatus is noise. Noise extending over a wide frequency band is present upon all communication circuits and its resultant effect upon the cross talk measurement is proportional to the band width of the detecting apparatus. If maximum freedom from this trouble is to be obtained, the band width of the detecting circuit must be made narrow. Further, the valves used in the detector produce within themselves noise covering an extended frequency spectrum, and this noise amplified by the successive stages of amplification is capable of producing spurious deflections of the output meter. Again the usual cure for this is to restrict the band width of the detecting apparatus.

Since the detecting apparatus has to detect frequencies over a wide frequency range some means has to be adopted to tune it to the frequency at which the measurements are being made.

Figure 1:
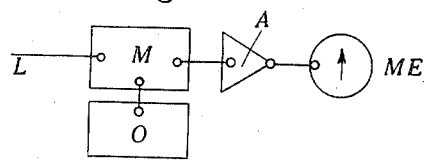

This is usually done by making use of the beat frequency principle, whereby the incoming frequency to be detected mixes with a locally generated frequency in a modulator, the local frequency being so chosen that the beat frequency produced equals the frequency to which an amplifier coming after the modulator is tuned. This frequency is usually 1 kc. and the general arrangement is shown in Fig. 1 of the accompanying drawing. The line L upon which measurements are to be taken is connected to a modulator M to which also is connected an oscillator O which is variable in frequency throughout the desired range. The output of the modulator M is connected to an amplifier A tuned sharply to pass a frequency of 1 kc., and the meter or indicating instrument ME is connected to the output of the amplifier A.

If this circuit is to have a sensitivity of 130 db. or more, and give no deflection of the output meter due to noise, it is essential that the tuned amplifier A shall have an exceptionally narrow band width.

Detector-amplifiers can be designed to give this high degree of sensitivity, but in practice they are almost useless. The circuit being so very selective, the sharpness of tuning results in great loss of time, and inaccurate results.

Most cross talk measurements upon carrier circuits take the form of far end measurements, with the testing oscillator located at the far end of the circuit with respect to the detector-amplifier. The operator has therefore to adjust the detector-amplifier until it is exactly in tune with a distant oscillator and the two circuits have to remain in tune during the course of a measurement. This process has to be repeated for every different frequency. Experience has shown that the conventional detector-amplifier is either too critical to adjust or else if made less selective suffers from noise troubles.

It is the object of the present invention to provide a method of measuring transmission characteristics which will allow the maximum possible selectivity to be attained and at the same time minimises the adjustments required.

Figure 2:
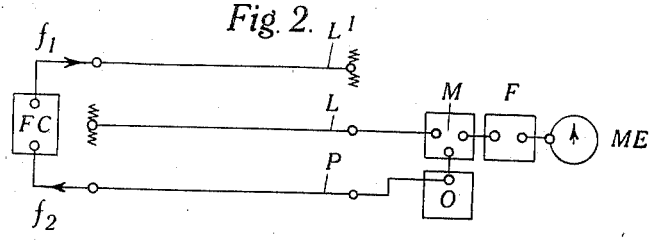

The invention and the manner in which it is to be performed are illustrated in the simplest form in Fig. 2 of the accompanying drawing, as applied to the measurement of far end cross talk.

The detector-amplifier connected to the line L consists of a modulator M, followed by an amplifier F which includes a filter of very narrow band width passing a frequency of 1 kc.

The modulator is fed from a local heterodyne oscillator O, which is the only variable oscillator required. In addition to being connected to the modulator this oscillator is also connected to a spare cable pair P (always available when cable cross talk is being measured).

At the far end of the spare pair P (to be called the "transmission pair") is a unit FC which by means of a process of double modulation reduces the frequency of any input by 1 kc. Hence, should the input be $f_2$ kc., the output will equal $(f_2—1)$ kc. This unit which is to be referred to as a frequency changer, needs no adjustment when the input frequency is changed, either with respect to frequency or level, the output will always be 1 kc. less than the input frequency and of constant output level.

Suppose it is required to measure the cross talk at frequency $f_1$. This frequency must be generated by the frequency changer FC which is connected to the disturbing circuit L'. To do this an input frequency $f_2$ such that $f_2-1=f_1$ must be applied to the frequency changer FC. Frequency $f_2$ is derived via the transmission pair P from the variable heterodyne oscillator O, and therefore this oscillator is adjusted to frequency $f_2$, which is 1 kc. greater than $f_1$. We therefore have on the disturbing circuit L' the required frequency $f_1$. By means of the cross talk coupling this frequency reaches the disturbed pair L and is received at the input to the modulator M. In the modulator it beats with the local frequency $f_2$ to produce two side bands $f_2+f_1$ and $f_2+f_1$.

Now $f_2=f_1+1$ kc.
Hence the two sideband frequencies are:
Upper sideband $(f_1+1)+f_1=2f_1+1$ kc.
Lower sideband $(f_1+1)-f_1=1$ kc.

The 1 kc. sideband is passed by the band pass filter to the output meter ME.

It will be seen that the tuning of the detector-amplifier is quite automatic, hence a band pass filter of exceptionally narrow band width may be used.

The operator has therefore only to vary the frequency of the variable oscillator O. Frequency $f_2$ generates $f_1$ and at the same time tunes the detector-amplifier to this frequency. Although a detector-amplifier of high selectivity is being used the operator can completely disregard such a fact, to him the circuit is always in tune. Further, the control is now at one end of the circuit and no requests for oscillator changes have to be sent to the far end.

Figure 3:
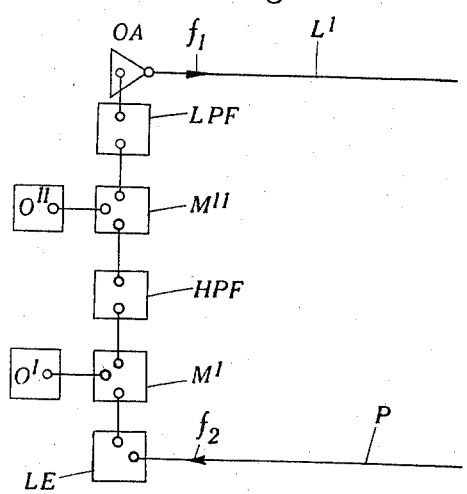

One form of construction of the frequency changer will be clear from Fig. 3 of the accompanying drawing.

The frequency $f_2$ from the oscillator O (which is, of course, variable at will when measurements are to be made over a frequency range) is applied to a modulator M' to which is applied a fixed frequency $f_3$ from an oscillator O'. The products of modulation are $f_3+f_2$ and $f_3-f_2$. The upper sideband $f_3+f_2$ is selected by a filter HPF and applied to a modulator M" to which is supplied a frequency $f_4$ from a second local oscillator O". This frequency $f_4$ is such that $f_4-f_3=1$ kc. The products of modulation in this case are $(f_3+f_2)+f_4$ and $(f_3+f_2)-f_4$. The lower sideband is selected by the filter LPF viz. $(f_3+f_2)-f_4$ i. e. $f_2-1$. This frequency is that required for test purposes, since with the frequency $f_2$ from the local oscillator of the detector amplifier it gives a lower sideband of 1 kc. The output from the filter LPF is preferably applied to an amplifier OA of the kind which gives a constant output level irrespective of variations in the input level. The output of amplifier OA is connected to the circuit on which the testing frequency is required, in the case illustrated, the disturbing circuit L'.

The method according to the invention is applicable to the measurement of either far end cross talk or of the attenuation of an extended transmission circuit in both of which cases the source of frequency on which measurements are conducted is at a distance from the local oscillator of the detector amplifier and its advantages are most apparent in these cases. It will be appreciated that to avoid any alteration in the frequency of oscillators O' and O" arrangements are applied thereto which will ensure that their frequencies always differ by a constant. Although this is a comparatively simple matter with two fixed frequency oscillators as used in the present invention it presents considerable difficulties in the case of the two variable oscillators used in known arrangements. Thus the invention presents advantages in any case in which a frequency must be supplied for measurement purposes which must differ by a constant from the frequency of the oscillator of a detector amplifier and in which measurements are to be made by the latter over a range of frequencies. The invention is thus applicable to the measurement of near end cross talk or to the measurement by a bridge method of the transmission characteristics of a network such as a filter.

The invention is applicable either to measurements at carrier frequencies or at voice frequencies. For voice frequencies it provides a method of accurately determining the resultant weighted cross talk for the voice frequency range. For this purpose the disturbed circuit is connected to the measuring device over a network which weights the different frequencies in accordance with their disturbing effect upon telephone conversation.

The characteristics of this network are specified by the Comité Consultatif Internationale Telephonique and it is of known construction. The frequency produced by the local oscillator of the measuring device is then varied throughout the voice frequency range at a rapid rate e. g., 1,000 times a minute. The meter ME then indicates the effective cross talk for the voice frequency range.

The invention also presents considerable advantages as applied to an automatic far end cross talk or attenuation recorder for either voice or carrier frequencies. For this purpose the meter ME is replaced by a meter recording its reading on a roll of paper traversed past the recording pen of the meter by means of a drum or cylinder on which the paper is rolled. In existing recorders of this type it is necessary to drive this drum or cylinder automatically by means synchronised with driving means for an oscillator at the distant end of the circuit, the output of this oscillator being applied to the distant end of the disturbing circuit in the case of far end cross talk measurement or to the distant end of the circuit under measurement in the case of attenuation measurements. These driving means are, of course, also synchronised with the driving means for the local oscillator of the measuring device. By the use of the present invention and by mounting the movable plates of the condenser of the local oscillator on the spindle of the cylinder carrying the roll of paper, the recording drum may be rotated by hand, and the necessity for the synchronising arrangements disappears.

It is clear that, since the frequency sent from the local oscillator over the pair of wires P in Figs. 2 and 3 to the distant end of the line differs from the frequency at which measurements are being taken, no disturbance of cross talk measurements arises from this cause, and it is also clear that it is not essential to send the output of the local oscillator O over a spare pair of wires P, but the disturbing circuit L' could be used for such purpose. In the case of attenuation measurements the frequency from the local oscillator O can be sent to the distant end of the line over the circuit under measurement. It is also clear that the circuits L and L' need not be pairs of wires but can be any forms of transmission circuits such as different carrier channels.

What is claimed:

1. A system for measuring the transmission properties of a given transmission channel having an input and an output, at a single readily variable test frequency; which comprises a source of master oscillations of readily variable frequency; a frequency shifting arrangement including oscillation producing means and means for modulating said master oscillations with the oscillations produced by said oscillation producing means to yield testing oscillations whose frequency differs by a predetermined number of cycles per second from that of said master oscillations, whereby the frequency of said testing oscillations may be readily varied by varying the frequency of said master oscillations while maintaining said frequency shifting arrangement unchanged; means for applying said testing oscillations to the input of the given channel; means for deriving transmitted oscillations from the output of the given channel; means for modulating said transmitted oscillations with master oscillations derived directly from said same source independent of said given channel to yield oscillations of a predetermined frequency; sharply selective means for selectively passing said oscillations of predetermined frequency; and measuring means for measuring said selectively passed oscillations.

2. A system for measuring the transmission properties of a given transmission channel having an input and an output, at a single readily variable test frequency; which comprises a source of master oscillations of readily variable frequency; a frequency shifting arrangement including first and second oscillation producing means for producing oscillations whose frequencies differ by a predetermined number of cycles per second, means for modulating said master oscillations successively with the oscillations produced by said first and second oscillation producing means to yield testing oscillations whose frequency differs by said predetermined number of cycles per second from that of said master oscillations, and filter means having pass characteristics broad enough to pass said testing oscillations in spite of substantial variations of the frequency thereof while blocking other modulation components, whereby the frequency of said testing oscillations may be readily varied by varying the frequency of said master oscillations while maintaining said frequency shifting arrangement unchanged; means for applying said testing oscillations to the input of the given channel; means for deriving transmitted oscillations from the output of the given channel; means for modulating said transmitted oscillations with master oscillations derived directly from said source independent of said given channel to yield oscillations of a predetermined frequency corresponding to said predetermined number of cycles per second; sharply selective means for selectively passing said oscillations of predetermined frequency; and measuring means for measuring said selectively passed oscillations.

3. A system for measuring the transmission properties of a given extensive transmission channel, having an input at a first location and an output at a second location remote from said first location, at a single readily variable test frequency; which comprises a source of master oscillations of readily variable frequency at said first location; an auxiliary channel extending between said first and second locations and connected to transmit said master oscillations to said second location; a frequency shifting arrangement at said second location including first and second oscillation producing means for producing oscillations whose frequencies differ by a predetermined number of cycles per second, means for modulating said transmitted master oscillations successively with the oscillations produced by said first and second oscillation producing means to yield testing oscillations whose frequency differs by said predetermined number of cycles per second from that of said master oscillations, and filter means having pass characteristics broad enough to pass said testing oscillations in spite of substantial variations of the frequency thereof while blocking other modulation components, whereby the frequency of said testing oscillations may be readily varied by varying the frequency of said master oscillations while maintaining said frequency shifting arrangement unchanged; means at said second location for applying said testing oscillations to the input of the given channel; means at said first location for deriving transmitted oscillations from the output of the given channel; means at said first location for modulating said transmitted oscillations with master oscillations derived directly from said same source independent of said given channel to yield oscillations of a predetermined frequency corresponding to said predetermined number of cycles per second; sharply selective means for selectively passing said oscillations of predetermined frequency; and measuring means for measuring said selectively passed oscillations.

4. A system according to claim 2, wherein said second oscillation producing means are adjusted to produce oscillations whose frequency exceeds that of said first oscillation producing means by said predetermined number of cycles per second, and wherein said filter means comprise a first filter which is designed to reject all frequencies below a cut-off limit at least as high as the frequency of said first oscillation producing means and which is connected to select the higher modulation products of said first modulation prior to said second modulation, and a second filter which is designed to reject all frequencies above a cut-off limit at least as low as the frequency of said second oscillation producing means and which is connected to select the lower modulation products of said second modulation prior to application to the input of the given channel.

EDWARD FENNESSY.